(12) United States Patent  
Wang

(10) Patent No.: US 8,222,589 B2
(45) Date of Patent: Jul. 17, 2012

(54) SOLID-STATE PHOTOMULTIPLIER MODULE WITH IMPROVED SIGNAL-TO-NOISE RATIO

(75) Inventor: Gin-Chung Jimmy Wang, Wynantskill, NY (US)

(73) Assignee: General Electric Company, Niskayuna, NY (US)

( * ) Notice: Subject to any disclaimer, the term of this patent is extended or adjusted under 35 U.S.C. 154(b) by 413 days.

(21) Appl. No.: 12/474,934

(22) Filed: May 29, 2009

(65) Prior Publication Data

US 2010/0301192 A1 Dec. 2, 2010

(51) Int. Cl.
*H01J 40/14* (2006.01)

(52) U.S. Cl. .................................. 250/214 R

(58) Field of Classification Search .................. 250/207, 250/214 VT, 214 R, 370.01, 370.08, 370.09
See application file for complete search history.

(56) References Cited

U.S. PATENT DOCUMENTS

| | | | |
|---|---|---|---|
| 6,521,894 B1 | 2/2003 | Iwanczyk et al. | |
| 6,522,396 B1 * | 2/2003 | Halmos | 356/5.01 |
| 7,329,860 B2 * | 2/2008 | Feng et al. | 250/234 |
| 7,403,589 B1 | 7/2008 | Short et al. | |
| 2008/0240341 A1 | 10/2008 | Possin et al. | |
| 2008/0308738 A1 | 12/2008 | Li et al. | |

FOREIGN PATENT DOCUMENTS

WO 2008107808 A2 9/2008

OTHER PUBLICATIONS

Christopher Stapels, William G. Lawrence, James Christian, Michael R. Squillante, Gerald Entine, Frank L. Augustine, Purushottam Dokhale and Mickel McClish; "Solid-State Photomultiplier in CMOS Technology for Gamma-Ray Detection and Imaging Applications"; Manuscript received Oct. 11, 2005. This work was supported in part by DTRA under Grant No. HDTRA 1-05-P0093; 5 pages.

* cited by examiner

*Primary Examiner* — Thanh X Luu
(74) *Attorney, Agent, or Firm* — Fletcher Yoder, P.C.

(57) ABSTRACT

A scanning imaging system is provided. The scanning imaging system comprises an illumination source for illuminating a sample with an excitation light, a filter to block emission light wavelengths from the illumination source. Further, the scanning imaging system comprises a SSPM module comprising a solid state photo multiplier to detect a photon flux and generate electrical signals based on impinging photons; a conditioning circuit to accumulate charge from the SSPM and a micro-controller to change a bias voltage applied to the SSPM to achieve a higher signal-to-noise ratio.

7 Claims, 5 Drawing Sheets

SOLID-STATE PHOTOMULTIPLIER MODULE WITH IMPROVED SIGNAL-TO-NOISE RATIO

BACKGROUND

Embodiments of the invention relate generally to a solid-state photomultiplier (SSPM) and more particularly to a signal-to-noise ratio optimized solid-state photomultiplier module.

Currently, vacuum photomultiplier tubes (PMTs) are used in various applications such as Laser gel and blot scanners, confocal microscopes, and two-photon microscopes. Unfortunately, these PMTs are expensive and generally provide low performance with respect to detection efficiency. In certain examples, SSPMs have been used in place of PMTs in an effort to reduce cost.

Traditionally, solid-state photomultipliers (SSPMs) include a photo sensor with an array of photodiodes operating above their breakdown voltage, typically known as a Geiger mode. These arrays of photodiodes may be referred to as Geiger photodiodes (GPDs). SSPMs are capable of achieving the low noise of a PMT at a low cost while retaining the high quantum efficiency of a silicon device. The SSPMs include a scintillating material that illuminates upon a reception of energy. The array of photodiodes detect illumination of the scintillating material. Since the light produced in the scintillation material is proportional to the energy of the absorbed event, the number of pixels that are activated provide the energy of the incident photon when the SSPM is uniformly illuminated.

Although SSPMs have several advantages over PMTs, there are two major technical challenges associated with SSPMs. SSPMs have a high dark count rate that may become a non-negligible source of noise. Another disadvantage of SSPMs relate to their limited number of microcells which include photodiodes connected to a quenching resistor. The limited number of microcells restrict the dynamic range of the corresponding SSPM. These disadvantages may be particularly undesirable in applications that typically require wider dynamic range and efficient detection at lower concentration or light levels, such as Laser gel and blot scanners.

It is therefore desirable to improve the dynamic range and reduce the dark count rate of the SSPM to achieve increased detection efficiency.

BRIEF DESCRIPTION

Briefly in accordance with one aspect of the present technique a solid-state photo multiplier module is provided. The solid-state photo multiplier module comprises a solid-state photomultiplier and a micro-controller configured to adaptively change a bias voltage applied to the solid-state photo multiplier to obtain a higher signal-to-noise ratio based on a photon flux from a sample.

In accordance with another aspect of the technique a scanning imaging system is provided. The scanning imaging system comprises an illumination source for illuminating a sample with excitation light; a filter to block emission light wavelengths from the illumination source. Further, the scanning imaging system comprises a SSPM module comprising a solid-state photo multiplier and a micro-controller configured to adaptively change a bias voltage applied to the solid-state photo multiplier for an optimized signal to noise ratio.

In accordance with yet another aspect of the technique a scanning imaging system is provided. The scanning imaging system comprises an illumination source for illuminating a sample with an excitation light, a filter to block emission light wavelengths from the illumination source. Further, the scanning imaging system comprises a SSPM module comprising a solid state photo multiplier to detect a photon flux and generate electrical signals based on impinging photons; a conditioning circuit to accumulate charge from the SSPM and a micro-controller to change a bias voltage applied to the SSPM to achieve a higher signal-to-noise ratio.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention are generally directed to a solid-state photo multiplier (SSPM) for improving a dynamic range while simultaneously reducing dark count rate. Such embodiments may be generally applicable in scanning imaging systems such as but not limited to Laser gel and blot scanners, confocal microscopes and two-photon microscopes. Further, embodiments of the present technique may also be applied to areas such as cytometry and real-time polymerase chain reaction (PCR).

Although, embodiments of the present invention are generally directed to SSPMs, it may be noted that the embodiments of the present invention may also be directed to other photodetectors, such as, but not limited to, a photomultiplier tube (PMT).

In a scanning imaging system, an illumination source emits electromagnetic radiation which strikes an imaging target that includes a substance, such as a fluorophore. The fluorophore in the imaging target is excited by the striking electromagnetic radiation and emits electromagnetic radiation of wavelength associated with the scanned imaging target. The emitted wavelength impinges on a photodetector such as a photomultiplier tube (PMT) or a solid-state photomultiplier (SSPM). The impinging electromagnetic radiation in turn cause the photodetector to generate electrical signals based on the incoming flux of electromagnetic radiation. Typically, the photodetectors are biased with a vendor recommended or a fixed bias voltage thereby generating electrical signals. However, a fixed bias voltage limits the dynamic range of the photodetector such as the SSPM for example, thereby causing amplification saturation. An intelligent module capable of removing the above-mentioned deficiencies in the photodetector such as a SSPM is presented herein.

Figure 1:
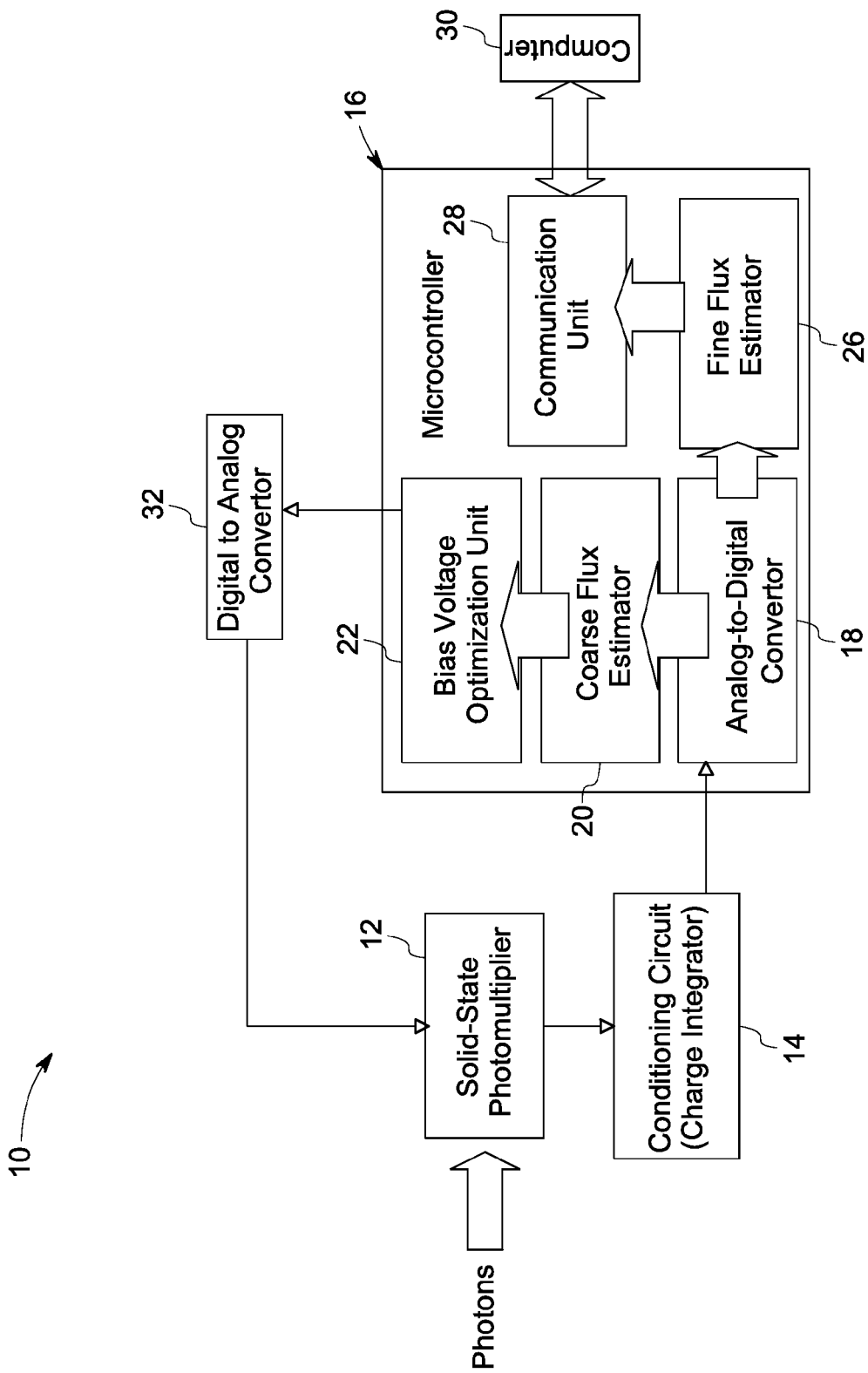
FIG. 1 is a block diagram of an exemplary SSPM module, in accordance with aspects of the present technique.

Referring now to FIG. 1, a block diagram illustrating an intelligent module such as an exemplary SSPM module 10 that may be used in scanning imaging systems is presented. The SSPM module 10 includes a solid-state photomultiplier (SSPM) 12 that detects electromagnetic radiation that typically may be emitted from a sample that is to be scanned. As previously noted, the sample emits electromagnetic radiation when excited by a wavelength of electromagnetic radiation from an illumination source. In one embodiment, a plurality of photons may impinge on the SSPM 12. It may be noted that the SSPM 12 converts the impinging photons or electromagnetic radiation from the sample (not shown) into analog electrical signals. A conditioning circuit 14 operationally coupled to the SSPM 12 may filter the analog electrical signals thereby reducing noise from the electrical signals. In the present embodiment, the conditioning circuit 14 may include a charge integrator. Alternatively, the conditioning circuit 14 may be a conventional charge-to-voltage converter. The conditioning circuit 14 is configured to accumulate the electric charge from the electrical signals generated by the SSPM 12 and is capable of converting the electric charge into a digital representation. In accordance with aspects of the present technique, the SSPM module 10 may include a microcontroller 16. As depicted in FIG. 1, the microcontroller 16 may be operatively coupled to the conditioning circuit 14. Moreover, in accordance with aspects of the present technique, the microcontroller 16 may be configured to adaptively change a bias voltage applied to the SSPM 12 to achieve an optimized signal-to-noise ratio in the SSPM 12.

It may be noted that accuracy of an optical measurement achieved by a scanning imaging system is proportional to its signal-to-noise ratio (SNR) and its integration time ($\tau$). More particularly the accuracy of optical measurement A for a scanning imaging system can be written as:

$$A \propto SNR * \sqrt{\tau} \quad (1)$$

where A is the accuracy of optical measurement, SNR is signal to noise ratio, and $\tau$ is the integration time.

Since, SNR is inversely proportional to the integration time, for a high SNR, the integration time is reduced to achieve the same amount of accuracy of optical measurement. As discussed herein, the integration time generally refers to a time that the SSPM may require to acquire a signal from the sample. It may be noted that the sample may be a biological sample, for example, that has optically fluorescent tag molecules that emit light, which in turn may strike the microcells of the SSPM. During the integration time the output of the SSPM in the form of electrical charge may be integrated in a storage capacitor. The SSPM may be stepped over the sample but is generally stationary while collecting the signals from the sample. At the end of the integration time the total signal is proportional to the number of optical photons that may have impinged on the SSPM.

Further, in accordance with aspects of the present technique, the microcontroller 16 may be configured to reduce the integration time for a given photon flux to meet a required signal-to-noise ratio. More particularly, the microcontroller 16 may be configured to reduce the integration time to about one-third of the integration time required when the microcontroller 16 is not used. The operation of microcontroller 16 will be described in greater detail hereinafter.

With continuing reference to FIG. 1, the voltage that is output from the conditioning circuit 14 typically may be in analog form. The voltage is processed by an Analog to Digital converter (ADC) 18, which converts the analog voltage into a digital voltage or into a numerical form. Thereafter, a coarse flux estimator 20 may be applied to estimate the flux based upon the digital voltage. The coarse flux estimator 20 provides an initial magnitude estimate of the flux, which is generally robust over an entire dynamic range of the SSPM 12. In one embodiment, a look up table may be used to estimate the flux from the digital voltage. A bias voltage optimization unit 22 may be employed to calculate an optimal bias voltage based on the estimated flux. Since the optimal bias voltage is calculated in digital form, it may be desirable to convert the digital voltage into an analog or real form. In one embodiment, the optimal bias voltage may be converted into analog form via use of a Digital to Analog converter (DAC) 32.

Further, the optimal bias voltage obtained consequent to processing by the DAC 32 may be applied to the SSPM 12. Thereafter, the SSPM 12 may generate electrical signals based on the optimum bias voltage applied to the SSPM 12 and the electrical charge thus generated by the SSPM 12 is accumulated by the conditioning circuit 14. The conversion from electrical charge, which is the output of the conditioning circuit 14 to an input flux on the SSPM 12, may not be linear. There may be a correction due to dead time in the SSPM, which increases in magnitude as the flux increases. As previously noted a look up table may be employed to convert the charge collected to an absolute optical input flux using a calibration step or an algorithm. The voltage in digital form may be applied to the fine flux estimator 26 to convert the charge from the ADC 18 to a corresponding flux with a desired resolution. The desired resolution may provide sufficient accuracy in the conversion to the estimated flux so that a decision may be made to change the integration time thereby allowing increased dynamic range and an optimal SNR. In one embodiment, the decision to change the integration time may be made by the computer 30.

Furthermore, the microcontroller 16 may include a communication unit 28, which is capable of communicating the estimated flux to the computer 30. The communication unit 28 may include a receiver, a transmitter and an amplifier. In other embodiments, the communication unit may be a hardware and/or firmware component to send the flux information to the computer 30. The communication unit 28 may also include a USB transceiver to supply the information to the computer 30. More particularly, the estimated flux from the fine flux estimator 26 may be communicated to the computer 30 via the communication unit 28 for processing and storage of data. The computer 30 may include hardware and software specific to the scanning imaging system. In one embodiment, the computer 30 may control the motion of the SSPM 12 as it scans the sample. The computer 30 may also be configured to provide input to an application program that may show an activity image of the sample, or to provide quantitative information about the sample.

Figure 2:
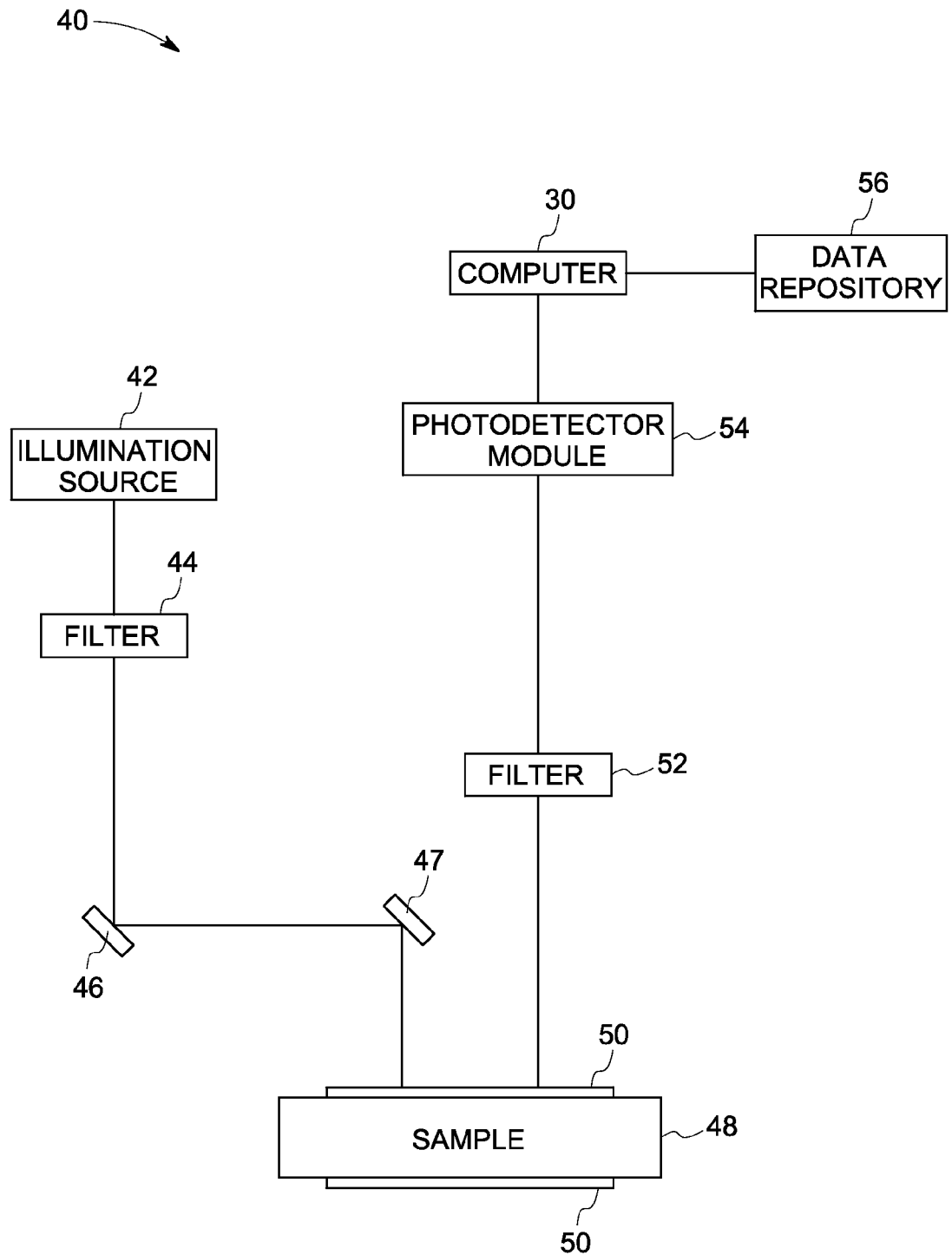
FIG. 2 is a block diagram of a Laser gel scanning system, in accordance with aspects of the present technique.

As previously noted, the exemplary SSPM module 10 may be used in scanning imaging systems such as, but not limited to Laser gel and blot scanners, confocal microscopes and two photon microscopes. Referring now to FIG. 2, a schematic diagram of a sample Laser gel scanning system 40 employing the SSPM module 10 of FIG. 1 is presented. The Laser gel scanning system is capable of sensitive and selective detection of fluorophore labeled biological substance such as proteins. The Laser gel scanning system 40 includes an illumination source 42 capable of emitting light onto a sample 48 to cause emission of light in fluorescent wavelengths. The emission light may be detected by a photodetector module 54 such as the SSPM module 10 of FIG. 1, which in turn is operationally coupled to a computer 30. The computer 30 is configured to produce images of the sample 48, based on the emitted light detected by the photodetector module 54 and subsequently display the images on a display device such as, a monitor (not shown in FIG. 2). In a presently contemplated configuration, the photodetector module 54 includes a photodetector such as a solid-state photo multiplier (SSPM) 12 (see FIG. 1).

In accordance with aspects of the present technique, the illumination source 42 may be used to illuminate the sample 48. The illumination source 42 typically may be a laser source, configured to emit a laser beam. However, it may be noted that other illumination sources such as a halogen lamp or other suitable electromagnetic radiation source may be used as the illumination source 42. In one embodiment, the sample 48 may include a substance, such as but not limited to a fluorophore, which emits or is capable of emitting an electromagnetic radiation when excited by the radiation from the illumination source 42. In another embodiment, the sample 48 may include an electrophoresis gel (not shown in FIG. 2), which may be positioned between glass plates 50. In yet another embodiment, the sample 48 may be a biological sample. In one embodiment, the electromagnetic radiation generated by the illumination source 42 first may be collimated and passed through a filter 44 capable of allowing the electromagnetic radiation of a fluorophore excitation frequency to pass. The filtered laser beam further may be aimed at mirrors 46, 47 that direct the filtered laser beam towards an area in the sample 48 that is to be scanned.

The sample 48 emits electromagnetic radiation when excited by the radiation from the illumination source 42. The emitted electromagnetic radiation may be passed through a second filter 52 located between the sample 48 and the photodetector module 54. It may be noted that the second filter 52 may be an optical filter and may be capable of blocking wavelengths of light that may be reflected from the sample 48. In other words, the filter 52 allows electromagnetic radiation of emission wavelength to pass while blocking the other wavelengths such as that which are reflected from the sample 48. The electromagnetic radiation of emission wavelength may be further detected by the photodetector module 54. As noted hereinabove, the photodetector module 54 may include a photodetector such as the SSPM 12 (see FIG. 1) adapted to generate a signal in response to the intensity of the detected emitted fluorescence electromagnetic radiation.

Moreover, the Laser gel scanning system 40 may also include a storage unit such as a data repository 56 that may be used to store data. It should be understood that any type of computer accessible memory device capable of storing the desired amount of data and/or code may be utilized by such an exemplary Laser gel scanning system 40. Furthermore, the data repository 56 may include one or more memory devices, such as magnetic, solid state, or optical devices, of similar or different types, which may be local and/or remote to the Laser gel scanning system 40. The data repository 56 may store data, processing parameters, and/or computer programs including one or more routines for performing the processes described herein.

Figure 3:
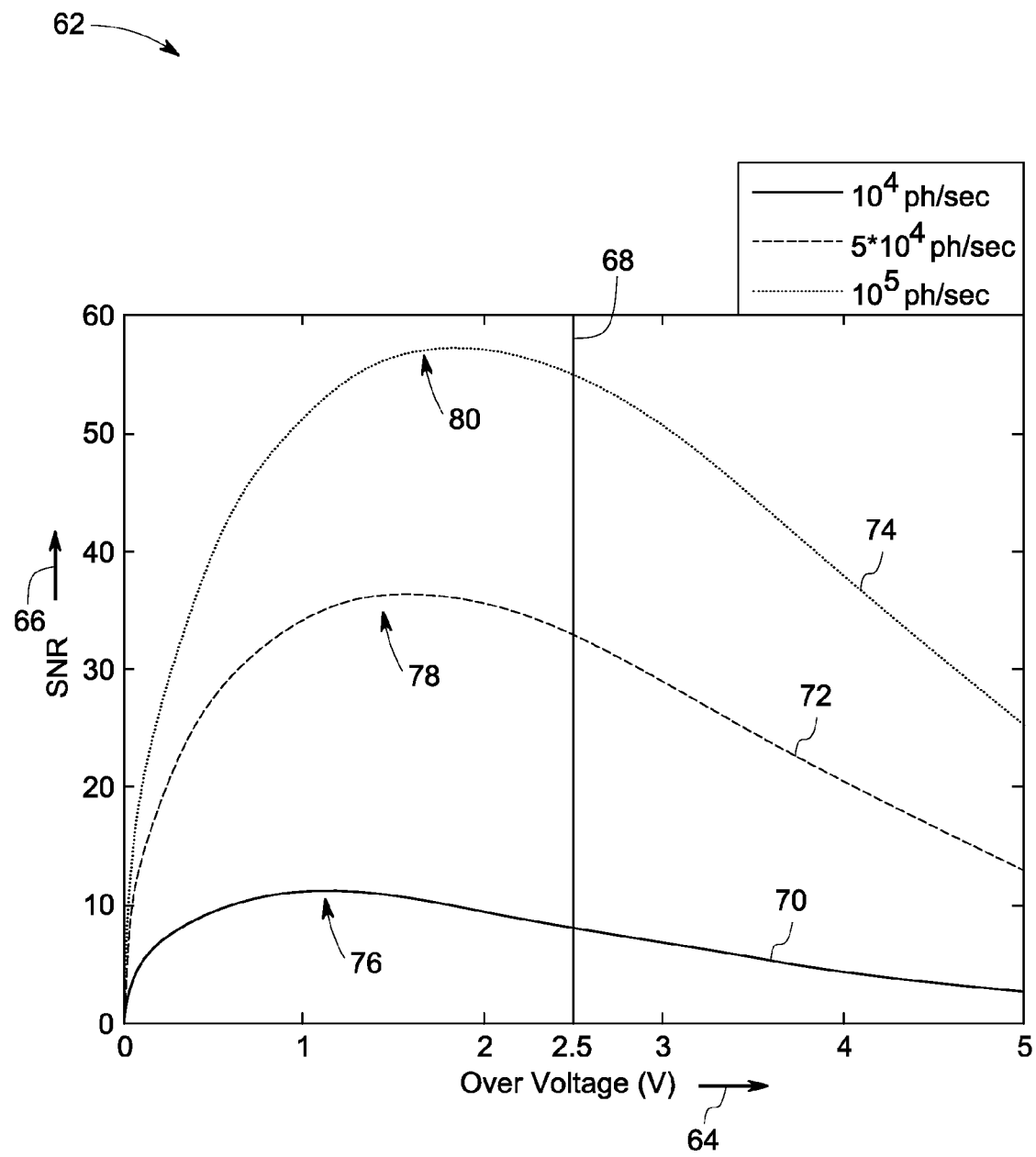
FIG. 3 is a graphical illustration depicting improvement in SNR at a low flux, in accordance with aspects of the present technique.

Through the use of the photodetector module 54 (in the form of SSPM module 10), the performance of the Laser gel scanning system 40 may be enhanced by improving the SNR of the SSPM 12 (see FIG. 1) especially at lower flux. More particularly, the SSPM module 10 may improve the SNR of the SSPM to about 30% with respect to a vendor recommended operating voltage at low flux. FIG. 3 is a graphical illustration 62 of improvement in SNR of an SSPM at low flux. A horizontal axis 64 may be representative of an over voltage and a vertical axis 66 may be representative of SNR. It may be noted that the over voltage is the difference between applied bias voltage and the breakdown voltage of an SSPM. Reference numeral 68 may be representative of a fixed voltage or a vendor recommended operating voltage or over voltage. In FIG. 3 the fixed voltage is shown as having a value of about 2.5V, for example. Reference numerals 70, 72 and 74 are representative of a first curve, a second curve and a third curve depicting variation of SNR as a function of over voltage at a flux of $10^4$, $5.0*10^4$ and $10^5$ photons per second, respectively. Also, reference numerals 76, 78 and 80 are representative of maxima corresponding to the curves 70, 72 and 74 respectively. These maxima 76, 78, 80 are representative of SNR at the optimized bias voltage, according to aspects of the present technique. As illustrated, for the first curve 70, which is representative of a flux of $10^4$ photons/sec, the SNR at the vendor recommended operating voltage is about 8, while the SNR using the optimized bias voltage is about 12, according to aspects of the present technique. It may therefore be noted, that an increase of about 30% is observed in SNR in comparison to the SNR at the vendor recommended operating voltage at a low flux, that is, at $10^4$ photons/sec.

As previously noted, the microcontroller 16 (see FIG. 1) is capable of extending the dynamic range of a SSPM, such as the SSPM 12 of FIG. 1, to at least about $10^6$ molecules. It may be noted that the dynamic range refers to a range of absolute number of optical photons impinging on the SSPM. A dynamic range of $10^6$ implies a capacity of the SSPM to quantify a concentration of 1 million molecules at a higher end and 1 molecule at a lower end. Furthermore, as previously noted a limited number of microcells of a SSPM, restrict the dynamic range of the SSPM. More particularly, the output signal of a SSPM may be saturated when the number of impinging photons become comparable to the number of microcells. Further, the photon detection efficiency of a SSPM is dependent on the bias voltage. Hence the bias voltage may be changed according to the impinging photon flux to avoid saturation. The total charge that can be detected by the SSPM is equal to the product of capacitance of the avalanche photodiode and change in voltage during the breakdown:

$$\Delta Q = C_{diode} \Delta V = C_{diode} \times (V - V_B) \quad (2)$$

where $C_{diode}$ is the capacitance of avalanche diode, and $V_B$ is the breakdown voltage.

Further, the photon detection efficiency P(V, T) which is a function of bias voltage (V) and temperature (T) may be calculated as:

$$P(V, T) = P_0 \left(1 - e^{\frac{(V-V_B(T))}{V_C}}\right) \quad (3)$$

where $V_B$ is the breakdown voltage, and $V_C$ is the characteristic voltage for fitting purposes.

From Equations (2) and (3), the equivalent charge (EC) according to the applied bias voltage may be calculated as:

$$EC = Q_0 P_0 \left(1 - e^{\left(\frac{V-V_B(T)}{V_C}\right)}\right) C_{diode}(V - V_B(T)) \quad (4)$$

Figure 4:
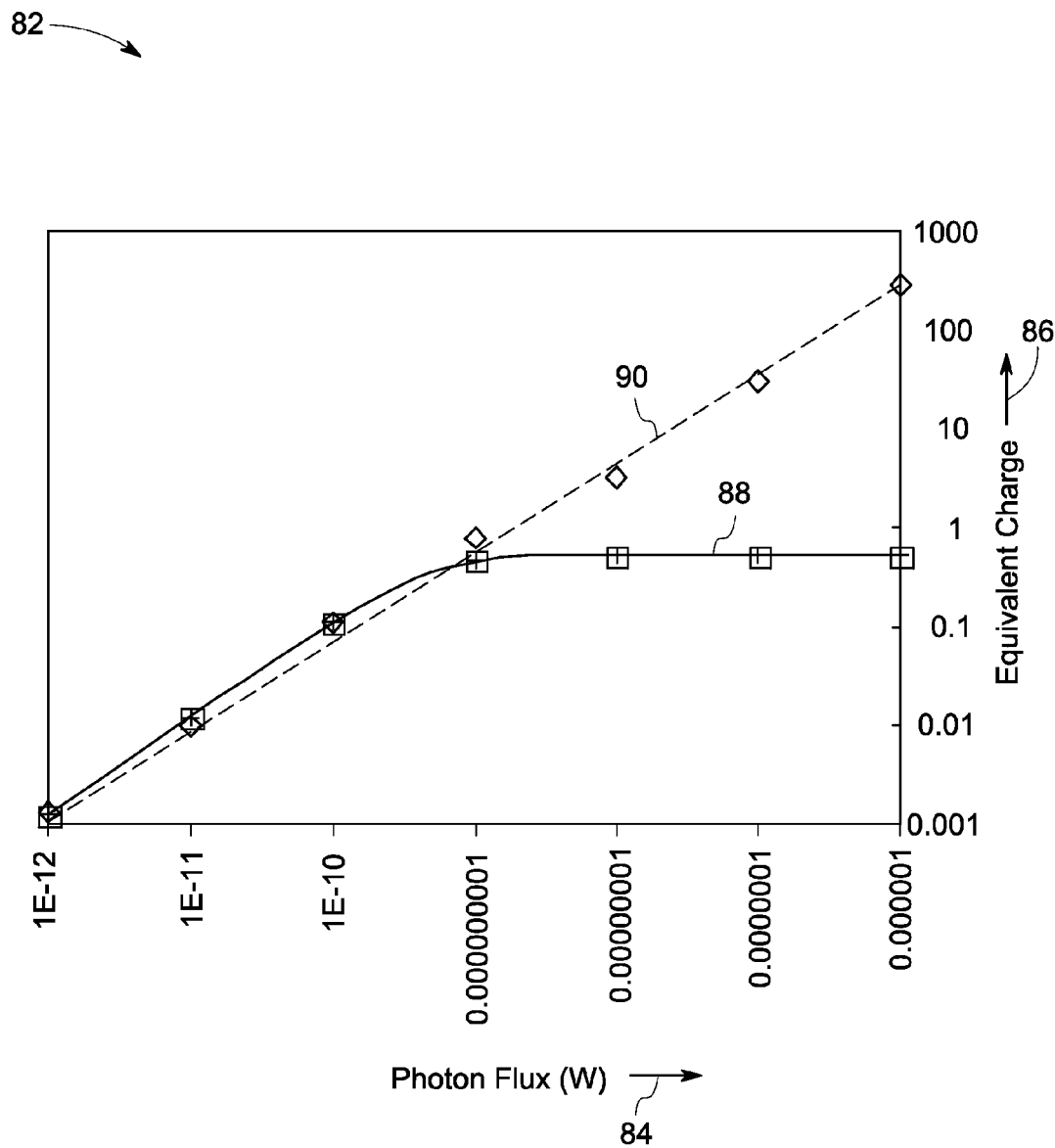
FIG. 4 is a graphical illustration depicting dynamic range extent, in accordance with aspects of the present technique.

FIG. 4 is a graphical illustration of the enhancement of the dynamic range of the SSPM 12 (see FIG. 1) via use of the microcontroller 16. The horizontal axis 84 may be representative of photon flux while the vertical axis 86 may be representative of an equivalent charge. Reference numeral 88 is representative of a variation of the equivalent charge as a function of the photon flux of the SSPM with a fixed bias voltage or a vendor recommended bias voltage. Reference numeral 90 is indicative of a variation of the equivalent charge as a function of the photon flux with adaptive bias in accordance with aspects of the present technique as calculated using Equation (4). As illustrated in FIG. 4, the SSPM, which is operated at a fixed bias, achieves a saturation value. On the contrary, the SSPM operated at an adaptive bias voltage in accordance with the aspects of the present technique shows an increase in the dynamic range from about $10^3$ to about $10^6$. In addition, the SSPM module 10 is capable of avoiding amplification saturation by adjusting bias voltage. Further, the curve, which is representative of variation of equivalent charge as a function of photon flux for the SSPM with adaptive bias voltage, depicts a linear correlation with coefficient of correlation $R^2=0.9972$.

Figure 5:
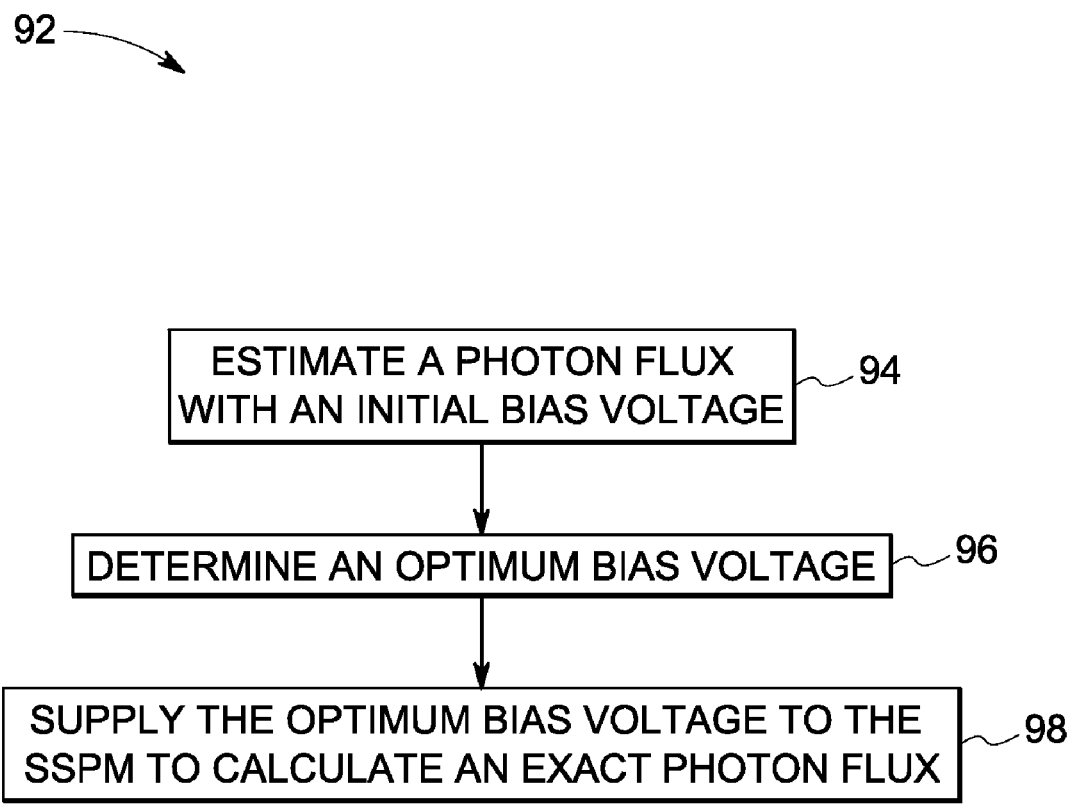
FIG. 5 is a flowchart depicting a method for use of an exemplary SSPM module in the exemplary laser gel scanning system of FIG. 2, in accordance with aspects of the present technique.

Referring now to FIG. 5, a flow chart 92 illustrating an exemplary method of optimizing signal-to-noise ratio in a solid-state photomultiplier in accordance with aspects of the present technique is presented. The method starts at step 94, where a photon flux with an initial bias voltage may be estimated. The photon flux impinging on an SSPM from a sample that is to be detected generates an electrical signal on the SSPM. As previously noted, the photon flux may be estimated by the coarse flux estimator 20 (see FIG. 1). The coarse flux estimator 20 provides an initial magnitude estimate of the flux that is robust over entire dynamic range of the SSPM. Further, an interactive feedback between changes in integration time, the signal collected and determination of integration time for signals collected subsequently may be achieved. Subsequently, an optimum bias voltage may be calculated based on a calibration step and algorithms, as indicated by step 96. In accordance with aspects of the present technique, a lookup table may be employed that converts charge collected to an absolute optical input flux using a calibration step to calculate the optimum bias voltage. Further, a fine flux estimator may also be used to calculate an exact value of the flux with a required resolution that provides accuracy in the conversion to the estimated flux thereby enabling change in integration time to provide increased dynamic range and an optimized SNR. Subsequently, the optimum bias voltage may be supplied to the SSPM to calculate an exact photon flux, as in step 98. It may be noted that the optimum bias voltage may be in a range from about 25V to about 80V.

The system and methods discussed hereinabove have several advantages such as providing a wider dynamic range to a scanning imaging system. Further, the techniques advantageously lead to a faster detection time and improve the ability of the system to detect light at low level or lower concentration.

The foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code, as will be appreciated by those of ordinary skill in the art, may be stored or adapted for storage on one or more tangible, machine readable media, such as on memory chips, local or remote hard disks, optical disks (that is, CDs or DVDs), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A scanning imaging system, comprising:
   an illumination source for illuminating a sample with excitation light;
   a filter positioned between the illumination source and a sample staging area, wherein the filter allows electromagnetic radiation from the illumination source at an excitation frequency to pass but blocks electromagnetic radiation from the illumination source at an emission frequency; and
   a SSPM module comprising:
      a solid-state photo multiplier configured to generate electric signals in response to light emitted from the sample at the emission frequency;
      a conditioning circuit configured to receive the electric signals generated by the solid-state photo multiplier and to output a voltage; and
      a micro-controller configured to receive the voltage from the conditioning circuit, to estimate a flux based upon the voltage, and to adaptively change a bias voltage applied to the solid-state photo multiplier based upon the estimated flux.

2. The scanning imaging system of claim 1, further comprising a conditioning circuit to accumulate charge and reduce noise of electrical signals from the solid-state photo multiplier.

3. The scanning imaging system of claim 1, further comprising a computer configured to process and store data.

4. The scanning imaging system of claim 1, wherein the solid-state photomultiplier generates electrical signals based on impinging photons from the sample.

5. A scanning imaging system comprising:
   an illumination source for illuminating a sample with an excitation light;
   a filter positioned between the illumination source and a sample staging area, wherein the filter allows electromagnetic radiation from the illumination source at an excitation frequency to pass but blocks electromagnetic radiation from the illumination source at an emission frequency; and
   a SSPM module comprising:
      a solid state photo multiplier to detect a photon flux and generate electrical signals based on impinging photons;
      a conditioning circuit to accumulate charge from the SSPM; and
      a micro-controller configured to change a bias voltage applied to the SSPM based on an estimate of the photon flux, wherein the micro-controller estimates the photon flux based on an output of the conditioning circuit.

6. The scanning imaging system of claim 5, wherein the microcontroller comprises an analog-to-digital converter to convert the accumulated charge from the conditioning circuit into a digital form.

7. The scanning imaging system of claim 5, wherein the microcontroller further comprises a coarse flux estimator that generates the estimate of the photon flux from the sample based on the accumulated charge.

* * * * *